Figure 1:
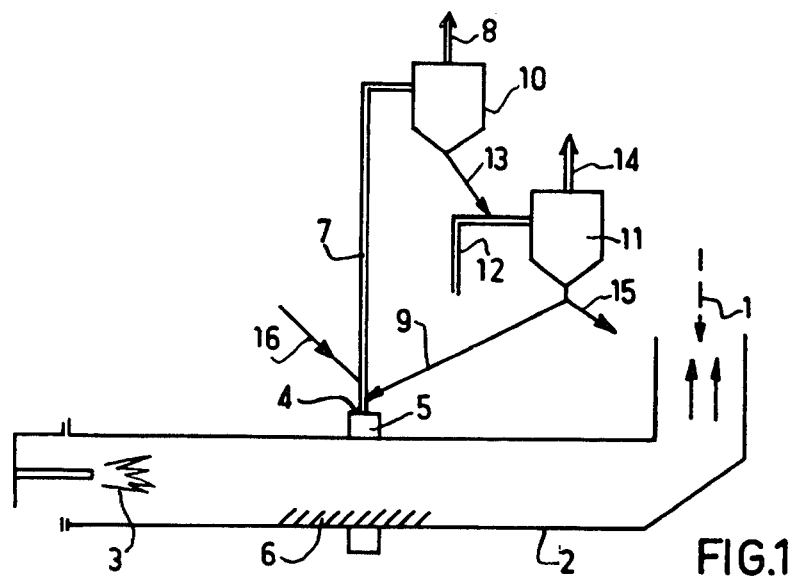

United States Patent [19]

Lovichi et al.

[11] 4,286,993

[45] Sep. 1, 1981

[54] METHOD AND INSTALLATION FOR MAKING CEMENT CLINKER

[75] Inventors: Jean P. Lovichi; Bernard le Bras, both of Montelimar, France

[73] Assignee: LaFarge Conseils et Etudes, Paris, France

[21] Appl. No.: 109,528

[22] Filed: Jan. 4, 1980

[30] Foreign Application Priority Data

Jan. 9, 1979 [FR] France .................. 79 00394

[51] Int. Cl.³ ............................................. C04B 7/02
[52] U.S. Cl. .................................................... 106/106
[58] Field of Search ......................................... 106/100

[56] References Cited

U.S. PATENT DOCUMENTS

| 3,212,764 | 10/1965 | Muller et al. ............ 106/100 |
| 3,317,201 | 5/1967 | Muller et al. ............ 106/100 |
| 3,887,388 | 6/1975 | Christiansen ............ 106/100 |
| 4,126,471 | 11/1978 | Herchenbach et al. ............ 106/100 |

FOREIGN PATENT DOCUMENTS

| 1295915 | 5/1962 | France . |
| 1473472 | 2/1967 | France . |
| 1558447 | 1/1969 | France . |
| 2198907 | 4/1974 | France . |

*Primary Examiner*—James Poer
*Attorney, Agent, or Firm*—Burgess, Ryan & Wayne

[57] ABSTRACT

The invention relates to a method and an installation for making cement clinker from a convenient raw material. The raw material is first partially decarbonated, then baked in a kiln where the decarbonation is completed, whereafter the material is clinkerized in the baking zone of the kiln wherein the volatile substances are removed from the material and at least a major part of the volatile substances are removed in the combustion gases. At least a portion of the combustion gases are diverted from the kiln at a location upstream of the baking zone, and the diverted gases are quenched by injecting cool powderous or granular material into the flow of said gases.

2 Claims, 4 Drawing Figures

METHOD AND INSTALLATION FOR MAKING CEMENT CLINKER

The present invention is related to a method of making cement clinker which allows, in particular, all or part of the volatile impurities, such as sulphur, chlorine, alkaline substances etc. to be removed from the baking circuit.

The invention is also related to an installation for carrying out the cement clinker making-method.

It is well known that in the conventional cement-making installations, the material to be treated is successively dried and partially decarbonated in an exchanger provided in a location upstream of the kiln, whereafter the material is completely decarbonated and converted into clinker in a rotary furnace or kiln.

It is also known that the presence of volatile substances, such as chlorine, sulphur or alkaline compounds in the fuel or the raw material may result in modifications of the quality of the clinker. Furthermore, when present in too great amounts, such volatile substances can cause the formation of deposits which lead, in turn, to interruptions of the operation of the installation.

Various expedients have been devised with a view to reducing or suppressing the cycling of volatile substances. The known methods are generally disadvantageous in that they involve ejecting a portion of the exhaust gases from the baking unit into the atmosphere; the high caloric content of these gases thus is lost for the remainder of the manufacturing process. Another drawback of these known methods resides in the fact that they lead to the production of considerable amounts of dust which can hardly be used for other purposes.

The present invention is aimed at providing a method and an installation which removes the volatile substances (or a portion thereof) from the gases while the major part of the energy carried by gases derived from the kiln is recovered, and only a very small amount of dust with a high concentration of condensed volatile substances is produced.

The method according to the invention comprises the steps of baking previously decarbonated raw material under reducing conditions so as to complete the decarbonation and produce clinker by causing volatilization in the baking zone of the major part of the volatile substances which are carried by the combustion gases, diverting at least a portion of said gases at a location substantially upstream of said baking zone, and quenching the thus derived gases by injecting a cool powderous or granular material into the flow of said gases.

Due to the injection of cool material the temperature of the entire system is lowered to such a value that the volatile substances fixed on said material become inert. In other words, all the volatile substances are condensed on the material injected into the diverted gas stream.

According to another feature of the instant invention, heat exchange is caused to take place between the heated material loaded with volatile substances and a flow of cool air to which said material transfers a major part of its thermal energy while being cooled, at least a portion of the thus cooled material being re-injected into the flow of combustion gases diverted at said upstream location of said baking zone, while the non reused portion of said material is removed from the circuit.

The invention thus provides a circuit of material which is progressively loaded with volatile substances prior to leaving the circuit.

Due to the invention it is possible to obtain a material with a high concentration of volatile substances as well as fumes issuing from the baking unit which are free from volatile substances; furthermore clean hot air is made available.

The material to be injected into the diverted gases is selected according to its capacity of capturing the chemical substances which have remained in the gaseous state in the fumes issuing from the kiln and which constitute a nuisance to the environment.

The invention will be described hereinbelow in a more detailed manner with reference to the appended drawings which are given by way of illustration, but not of limitation.

FIG. 1 schematically illustrates the method according to the invention as carried out in a cement-making installation wherein the fumes loaded with volatile substances are diverted from the zone of the ferrule of the kiln.

Figure 2:
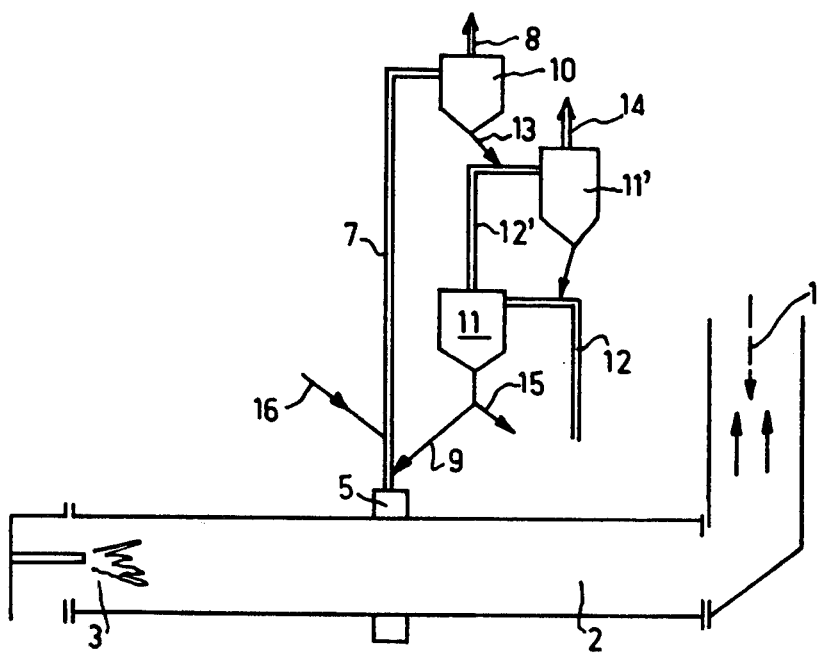
Figure 3:
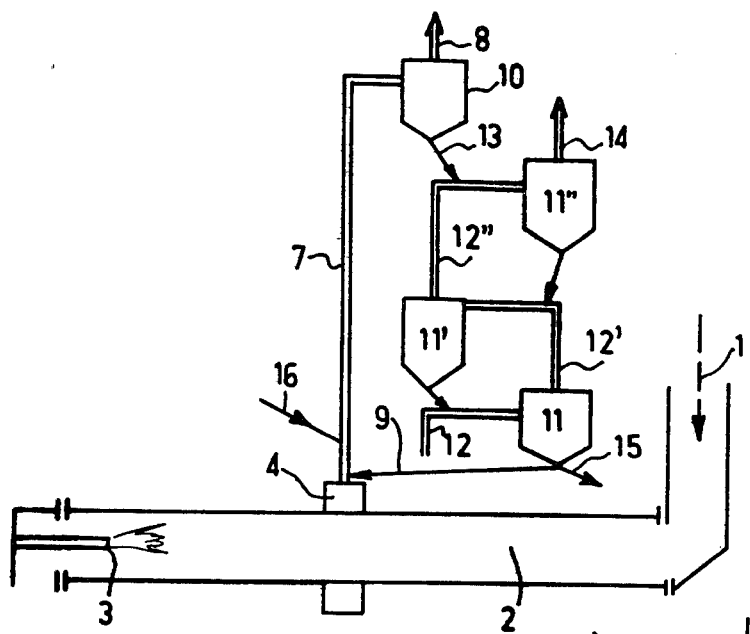

FIGS. 2 and 3, respectively, show two installations similar to that of FIG. 1, comprising two or three cooling cyclones, respectively.

Figure 4:
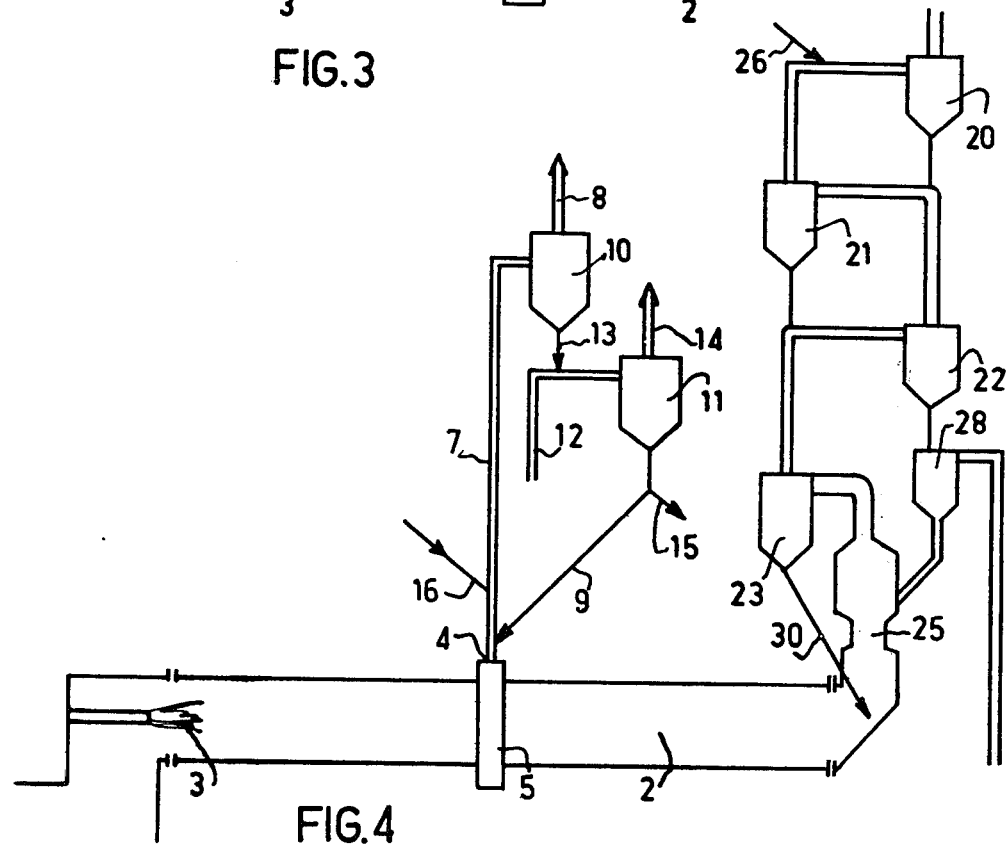

FIG. 4 shows a cement-making installation according to the invention.

According to the diagrammatic illustration of FIG. 1, raw material for making cement, which has possibly been submitted to a previous decarbonation treatment, is introduced at 1 into a rotary clinkerization kiln or furnace 2 where it undergoes a reducing combustion at 3, possibly with injection of water. Due to this reducing combustion, the major part of the volatile substances contained in the raw material is volatilized. According to the invention, at least a part of said volatile substances is diverted at 4 through the ferrule of the kiln, upstream of the baking zone 6, by means of a conduit 7. This location of the point of diversion permits by-passing gases carrying only a small amount of dust and having a high concentration of volatile substances in the gaseous state.

Cool material is injected at two locations into the by-passed gases; material recovered from the gases derived from the kiln through 7 is injected through 9, said material being separated from said gases in a first cyclone 10 into which by-pass conduit 7 opens and from which the cooled fumes issue at 8, said material being then introduced through 13 into a second cyclone 11 where it heats cool air injected into the second cyclone through 12; this air, when issuing through 14 from the second cyclone 11, is hot and is not polluted by the fumes issuing from the kiln. The material cooled in said second cyclone is injected, at least in part, through 9, the remainder of said material being removed from the circuit through 15.

To make up for the material removed through 15, fresh material is injected into by-pass or derivation conduit 7 through 16.

It will be understood from the foregoing that the installation described herein-above allows material with a high concentration of volatile substances to be obtained at 15, while fumes diverted from the baking unit and containing no volatile substances are obtained at 8, and purified heated air is available at 14.

FIGS. 2 and 3 represent, respectively, two installations similar to that shown in FIG. 1, which comprise two cyclones 11,11′ and three cylclones 11, 11′, 11″, respectively, for cooling the material previously used to quench the gases diverted through conduit 7, said matter being separated from said gases in cyclone 10. The cool air introduced through 12 into the lowermost cyclone 11 is pregressively heated as it flows successively through the cyclones and issues through 14 at high temperature, as previously explained, while the cooled material issuing through 9 from the lowermost cyclone 11 is either injected into by-pass conduit 7 with a view to quenching the fumes derived from the kiln at 4, or is removed through 15.

In FIG. 4 which shows an installation similar to that of FIG. 1, similar elements are designated by identical reference numerals. In this embodiment, the installation comprises a supplementary battery of cyclones 20 to 23 through which flow the fumes issuing through 25 from the flue of the kiln, the uppermost cyclone 20 being fed through 26 with cement-making raw material constituted, for example, by a mixture of calcium carbonate and clay.

The raw material is partially decarbonated in this battery of cyclones prior to being introduced into the kiln, and prior to its introduction into said kiln, it flows through a pre-calcinator 28 provided between the material outlet of the penultimate cyclone 22 and the flue of the kiln. The material issuing from precalcinator 28 and separated from the fumes of the kiln in the last cyclone 23 is introduced through 30 into the kiln where the decarbonation of said material is completed before the latter reaches the baking zone.

It should be noted that the reducing combustion which takes place in the kiln leads to the formation of carbon dioxide, and that due to the provision of the precalcinator the entire amount of this gas can be reused.

Thus by carrying out the above method in an installation such as the one described herein-above, more efficient capturing of the volatile substances and highly non-polluting operation of the installation can be achieved.

The cool air injected through 12 into the cooling cyclones may be replaced by any other gas which may or may not stem from the cement-making installation.

As regards the purified air reheated by the material circulating in the above-mentioned cooling cyclones, this can be used as hot combustion air at any location of the baking unit.

The invention is not limited to the embodiments shown and described herein-below. Many modifications and variants may be envisaged by those skilled in the art, without departing from the spirit and scope of the invention as defined in the appended claims.

What is claimed is:

1. A method of making clinker, which comprises:
   introducing previously decarbonated cement-making raw material into the baking zone of a kiln,
   baking said raw material under reducing conditions so as to complete the decarbonation of said raw material,
   clinkerizing said material in the baking zone whereby a major part of the volatile substances contained in said material are volatilized and carried by the combustion gases,
   diverting at least a portion of said gases from said kiln at a location upstream of the said baking zone,
   quenching the diverted gases by injecting into the flow of said gases a cool powderous or granular material to remove at least a portion of the volatile substances from the diverted gases and form a heated material loaded with volatile substances,
   causing heat exchange to take place between the heated material loaded with volatile substances and a flow of cool air to which said material transfers a major part of its thermal energy while being cooled,
   re-introducing at least a portion of the thus cooled material into the flow of combustion gases diverted at said location upstream of the baking zone, and
   removing the non re-introduced part of said material from the circuit.

2. The method of claim 1, wherein said material injected for quenching said diverted gases is so selected that it is adapted to capture by a chemical or physicochemical process substances in the gaseous state in the diverted gases which are possibly noxious to the environment.

* * * * *